United States Patent
Hazeyama et al.

(10) Patent No.: US 10,447,099 B2
(45) Date of Patent: Oct. 15, 2019

(54) ROTARY ELECTRIC MACHINE

(71) Applicant: MITSUBISHI ELECTRIC CORPORATION, Chiyoda-ku (JP)

(72) Inventors: Moriyuki Hazeyama, Chiyoda-ku (JP); Yoshihiro Miyama, Chiyoda-ku (JP); Taiga Komatsu, Chiyoda-ku (JP); Junji Kitao, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 40 days.

(21) Appl. No.: 15/752,941

(22) PCT Filed: Sep. 14, 2016

(86) PCT No.: PCT/JP2016/077161
§ 371 (c)(1),
(2) Date: Feb. 15, 2018

(87) PCT Pub. No.: WO2017/061244
PCT Pub. Date: Apr. 13, 2017

(65) Prior Publication Data
US 2018/0233973 A1    Aug. 16, 2018

(30) Foreign Application Priority Data

Oct. 6, 2015  (JP) .................................. 2015-198328

(51) Int. Cl.
*H02K 21/12* (2006.01)
*H02K 1/27* (2006.01)
(Continued)

(52) U.S. Cl.
CPC ............. *H02K 1/2766* (2013.01); *H02K 1/16* (2013.01); *H02K 1/22* (2013.01); *H02K 1/27* (2013.01);
(Continued)

(58) Field of Classification Search
CPC ......... H02K 1/27; H02K 1/2766; H02K 21/14
(Continued)

(56) References Cited

U.S. PATENT DOCUMENTS 8,729,763 B2 *  5/2014  Kogure ................ H02K 1/2766
                                                     310/156.53
8,766,503 B2 *  7/2014  Kagami ............... H02K 1/2766
                                                     310/156.53
(Continued)

FOREIGN PATENT DOCUMENTS

JP    2007-104888 A    4/2007
JP    2012-75278 A    4/2012
(Continued)

OTHER PUBLICATIONS

International Search Report dated Dec. 6, 2016, in PCT/JP2016/077161 filed Sep. 14, 2016.

*Primary Examiner* — Hanh N Nguyen
(74) *Attorney, Agent, or Firm* — Oblon, McClelland, Maier & Neustadt, L.L.P.

(57) ABSTRACT

A rotary electric machine, in which $\alpha > \beta$ is established when the teeth portion has a width $\alpha$ in a circumferential direction thereof, a rotation center of the rotor and one of corners, which is on a rotor surface side, on both ends of each of the permanent magnets are connected by a straight line, a center between an N-pole and an S-pole of the permanent magnets is on a q-axis, and an angle formed by two straight lines on the q-axis side is $\beta$, a first bridge part is provided between a flux barrier provided at the rotor core and the rotor surface, and $\gamma > \delta$ is established when the first bridge part has a minimum width $\gamma$, and the flux barrier has a minimum width $\delta$ on the q-axis.

16 Claims, 13 Drawing Sheets

(51) Int. Cl.
    *H02K 21/14*   (2006.01)
    *H02K 1/22*    (2006.01)
    *H02K 1/16*    (2006.01)
    *H02K 1/02*    (2006.01)

(52) U.S. Cl.
    CPC .............. *H02K 21/14* (2013.01); *H02K 1/02* (2013.01); *H02K 2213/03* (2013.01)

(58) Field of Classification Search
    USPC .......................... 310/156.57, 156.83, 156.53
    See application file for complete search history.

(56) References Cited

U.S. PATENT DOCUMENTS

| | | | |
|---|---|---|---|
| 8,957,560 B2 * | 2/2015 | Uchiyama | H02K 1/2766 310/156.56 |
| 2007/0018522 A1 * | 1/2007 | Ackva | H02K 1/276 310/156.46 |
| 2014/0077653 A1 * | 3/2014 | Takahashi | H02K 1/2766 310/156.53 |
| 2016/0141926 A1 | 5/2016 | Kano et al. | |

FOREIGN PATENT DOCUMENTS

| | | |
|---|---|---|
| JP | 2014-87077 A | 5/2014 |
| JP | 2015-53831 A | 3/2015 |
| WO | 2014/178227 A1 | 11/2014 |

* cited by examiner

TIME ( t )

ELECTRICAL ANGLE POSITION

TIME ( t $_2$ )

MAGNET TEMPERATURE

ROTARY ELECTRIC MACHINE

TECHNICAL FIELD

The present invention relates to a rotary electric machine.

BACKGROUND ART

A motor for use in an electric-drive vehicle such as an all-electric car and a hybrid car is driven at high rotation speed—the number of revolutions of 10000 r/min or more—and hence in the case where a permanent magnet is used in a rotor, a permanent magnet motor of interior permanent magnet type in which a magnet can be retained against centrifugal force resistance has been suggested (PTL 1 to PTL 3). A magnet including neodymium as a main component is used as a permanent magnet for use in an electric-drive vehicle, and heat generation in the magnet during high speed rotation can be a disadvantage.

Here, PTL 1 suggests a configuration in which magnets for a rotor are in a V-shaped arrangement, a flux barrier is provided on each side of the permanent magnet in the circumferential direction, and a gap is formed between the ends of the inner peripheral corners of the magnets, so that air is made to flow into the gaps between the magnets and the flux barriers in the axial direction to take away heat generated in the magnets and fins at axial ends are used for heat exchange.

PTL 2 discloses a configuration in which magnets for a rotor are in a V-shaped arrangement, and a ventilation passage for cooling is provided on an inner or outer peripheral side of the permanent magnet.

PTL 3 discloses a configuration in which magnets for a rotor are in a V-shaped arrangement, a flux barrier is provided at each of the circumferential both ends of the permanent magnets, gaps are provided on the inner peripheral side of the permanent magnets, a mold material for fixing a magnet is provided at the flux barrier and the gap, and a slit is provided at an inter-pole part, so that thermal stress at a bridge part between the slit and the flux barrier is alleviated.

CITATION LIST

Patent Literature

[PTL 1] Japanese Patent Application Publication No. 2014-087077
[PTL 2] Japanese Patent Application Publication No. 2007-104888
[PTL 3] Japanese Patent Application Publication No. 2015-53831

SUMMARY OF INVENTION

Technical Problem

Since a motor is driven at high rotation speed in an all-electric car, a hybrid car, etc., heat generation in a permanent magnet must be restrained, and a rotor must have satisfactory centrifugal force resistance, and while PTL 1 to PTL 3 disclose methods for cooling a permanent magnet, the problem described above cannot be solved using a motor having a large motor shaft size which is unfitted for heat exchange.

The present invention is in view of the foregoing, and it is an object of the present invention to provide, in a concentrated winding type motor, a rotary electric machine capable of restraining eddy-current loss at a permanent magnet generated during high speed rotation and securing centrifugal force resistance for the permanent magnet.

Solution to Problem

In order to achieve the object, a rotary electric machine according to the present invention includes a stator and a rotor, the stator includes an annular core back portion and a teeth portion that extends from the core back portion toward the rotor and has a stator winding wound therearound, the rotor includes a rotor core made of a magnetic material, and permanent magnets supported on the rotor core, $\alpha > \beta$ is established when the teeth portion has a width $\alpha$ in a circumferential direction thereof, a rotation center of the rotor and one of corners, which is on a rotor surface side, on both ends of each of the permanent magnets are connected by a straight line, a center between N-poles of the permanent magnets is on a d-axis, and a center between an N-pole and an S-pole of the permanent magnets is on a q-axis, and an angle formed by two of the straight lines on a q-axis side is $\beta$, a flux barrier is provided at each of circumferential both ends of each of the permanent magnets in the rotor core, the rotor core has a first bridge part between the flux barrier and the rotor surface, and $\beta > \delta$ is established when the first bridge part has a minimum width $\gamma$, and the flux barrier has a minimum width $\delta$ on the q-axis.

Advantageous Effects of Invention

According to the present invention, the strength of a magnet against centrifugal force during high speed rotation is retained by the first bridge part, and short-circuiting magnetic resistance at ends of the magnet is restrained by the second bridge, so that a magnetic flux leaked from the permanent magnet mostly passes the first bridge from an N-pole, enters an S-pole, and returns to the N-pole from the inner peripheral part of the rotor. Therefore, a magnetic flux leakage path for the N-pole on the inner peripheral side of the rotor through the first and second bridge parts from the N-pole can be restrained, so that magnetic resistance fluctuation by magnetic flux leakage can be restrained.

DESCRIPTION OF EMBODIMENTS

Figure 1:
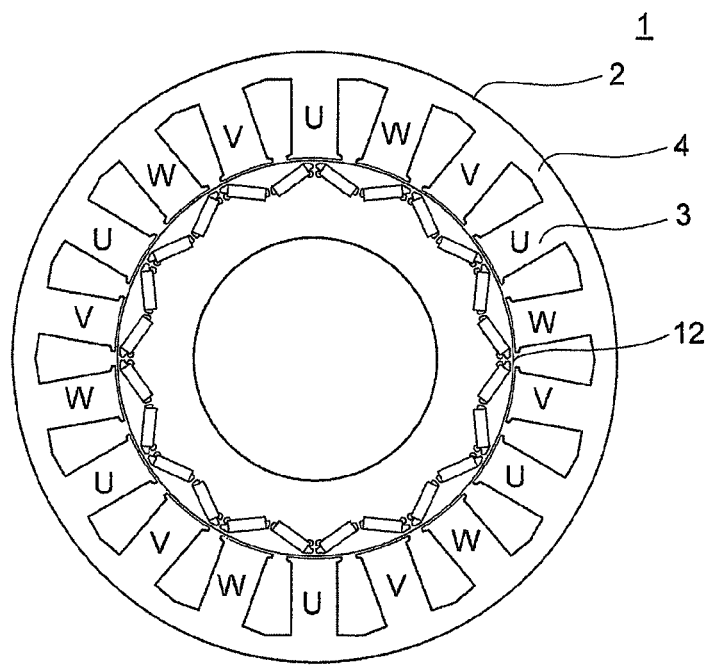
FIG. 1 is a sectional view of a stator and a rotor according to a first embodiment of the present invention.

Now, embodiments of the present invention will be described with reference to the accompanying drawings. Note that the same reference characters refer to the same or corresponding portions in the drawings.

First Embodiment

A concentrated winding type rotary electric machine using a permanent magnet 13 according to a first embodiment of the present invention includes a stator 1 and a rotor 11. FIG. 1 is a sectional view of the stator 1 and the rotor 11 according to the first embodiment. In FIG. 1, the stator 1 has an annular core back portion 4 and teeth portions 3 that protrude from the core back portion 4 toward the rotor 11, and the teeth portions 3 have stator windings wound therearound. The stator core 2 includes 18 protruding teeth portions 3 on the radially inner side and the annular core back portion 4. Each of the teeth portions 3 has a winding (not shown) provided therearound. The phases of the windings are arranged in the order of U, V, and W phases in the anti-clockwise direction.

Figure 2:
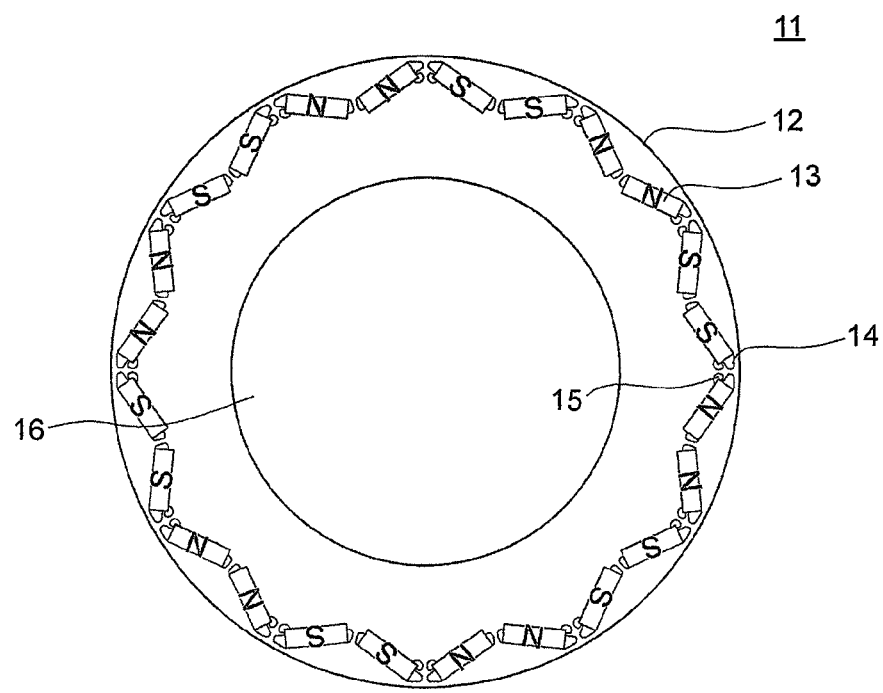
FIG. 2 is a sectional view of the rotor according to the first embodiment of the present invention.

FIG. 2 is a sectional view of the rotor 11. The rotor 11 is provided on the radially inner side of the stator 1 and includes four-sided permanent magnets 13 and a rotor core 12 made of a magnetic material having the permanent magnets 13 embedded therein. More specifically, the rotor 11 includes the rotor core 12, 24 permanent magnets 13 embedded in the rotor core 12, and a rotation shaft 16 on the radially inner side, and a flux barrier 14 is provided at each of both ends of the permanent magnet 13. Here, the permanent magnet 13 is a neodymium magnet in a substantially oblong shape and arranged on a two-per-pole basis in a V-shape toward the outer periphery of the rotor. Note that N and S as shown designate the poles of the magnets, and the magnetic flux direction of the N-pole is toward the outer periphery of the rotor, and the magnetic flux direction of the S-pole is from the outer periphery of the rotor toward the inner periphery. A magnetic flux fluctuation restraining hole 15 is provided on the radially inner side of the permanent magnet 13 at an inter-pole part (the boundary between the N and S-poles).

Figure 3:
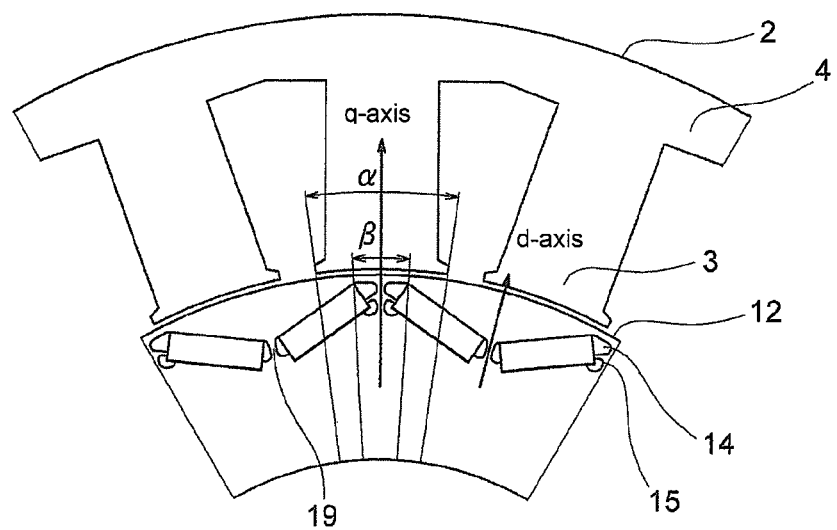
FIG. 3 is an enlarged view of the stator and the rotor according to the first embodiment of the present invention.

FIG. 3 is an enlarged view of the stator core 2 and the rotor core 12. Here, the center between the N-poles of magnets is on a d-axis, and the inter-pole part between the N and S-poles is on a q-axis. The d-axis and the q-axis will be used in the following description. In FIG. 3, the angle of the teeth portion 3 in the stator core 2 on the radially inner side is $\alpha$, and the angle on the outer peripheral side of the V-shaped inter-pole part of the permanent magnets 13 embedded in the rotor core 12 is $\beta$. More specifically, $\alpha > \beta$ is established when the circumferential width of the teeth portion 3 in the stator 1 is $\alpha$, the rotation center of the rotor 11 and one of corners, which is on the rotor surface side, on both ends of the permanent magnet 13 are connected by straight lines, the d-axis is through the center between the N-poles of the permanent magnets 13, the q-axis is through the center between the N-pole and the S-pole of the permanent magnets 13, and the angle formed by the two straight lines on the q-axis side is $\beta$. In a concentrated winding type motor, magnet torque generated by the permanent magnets is a main factor of torque, and therefore the width of the permanent magnet must be large in order to generate torque, or $\beta$ must be small, so that the outer peripheral angle $\beta$ of the rotor is smaller than the tip end width $\alpha$ of the teeth portion ($\alpha > \beta$).

The flux barrier 14 for preventing flux short-circuiting of the permanent magnet 13 is provided at each of circumferential both ends of the permanent magnet 13 in the rotor core 12, the rotor core 12 has a first bridge part 17 between the flux barrier 14 and the rotor surface, $\gamma > \delta$ is established when the minimum width of the first bridge part 17 is $\gamma$ and the minimum width of the flux barrier 14 on the q-axis is $\delta$, and the part of the rotor core from the rotor surface on the q-axis to the radial position of $\delta$ is made of a magnetic material, in other words, a so-called hollow region such as a slit is not provided in the part. This will further be described with reference to the drawings.

Figure 4:
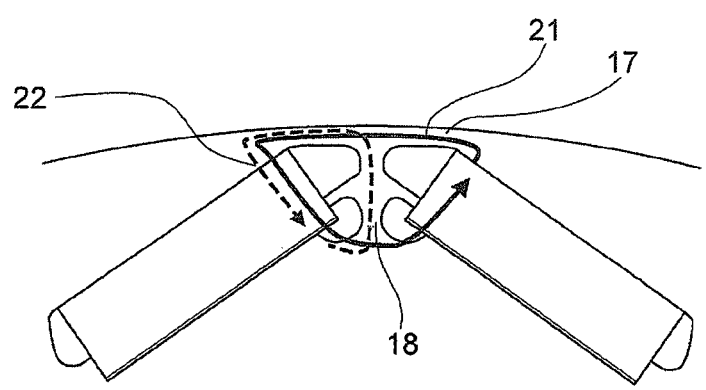
FIG. 4 is a view showing first and second magnetic flux leakage paths at an inter-pole part in the rotor according to the first embodiment of the present invention.

FIG. 4 shows a magnetic flux leaked from a magnet when there is no load in the relation between the width α of the teeth portion and the magnet width shown in FIG. 3. As shown in FIG. 4, when there is no load, there are a first magnetic flux leakage path 21 that passes the first bridge part 17 at the surface of the rotor from the N-pole permanent magnet 13 and returns from the S-pole permanent magnet 13 to the N-pole through the rotor core 12, and a second magnetic flux leakage path 22 that passes the first bridge part 17 and the second bridge part 18 from the S-pole permanent magnet 13 and returns to the S-pole permanent magnet 13. The second magnetic flux leakage path is the same for the N-pole.

Figure 5:
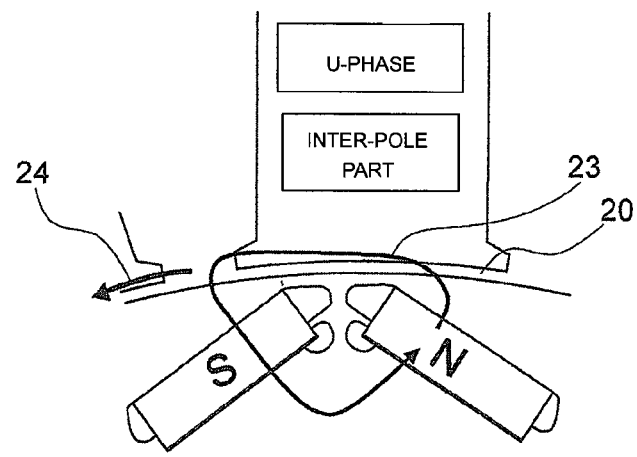
FIG. 5 is a view showing the stator, the rotation direction of the rotor, and a third magnetic flux leakage path according to the first embodiment of the present invention.
Figure 6:
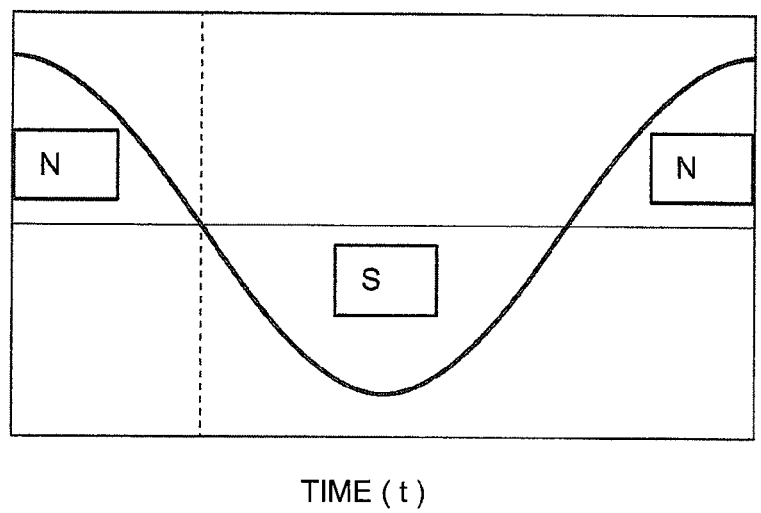
FIG. 6 is a graph showing the time course of magnetic poles in a U-phase winding in a stator according to the first embodiment of the present invention.

FIG. 5 shows a path of a leaked magnetic flux that does not contribute to torque when the magnetic flux is weakly controlled. The weak magnetic flux control is to create a magnetic flux in an opposite direction to the direction of the magnetic flux of the permanent magnet 13 using a stator coil and refers to control carried out during motor torque application. In the weak magnetic flux control, when for example a magnetic flux created by a U-phase winding is between an N-pole and an S-pole (at an inter-pole part where there is no magnetic flux), more specifically in the timing indicated by the broken line in FIG. 6, the inter-pole part between the N-pole permanent magnet 13 and the S-pole permanent magnet 13 in the rotor 11 is ahead of the center of the U-phase teeth portion 3 in the rotation direction 24.

In addition to the first and second magnetic flux leakage paths with no load as shown in FIG. 4, another magnetic flux leakage path at the time is a third magnetic flux leakage path 23 that passes a gap 20 between the rotor 11 and the stator 1 from the N-pole permanent magnet 13, interlinks with the tip end of the teeth portion 3 of the stator 1 in the circumferential direction, then passes the S-pole permanent magnet 13 from the gap 20, and returns to the N-pole permanent magnet 13 from the rotor core 12. This is because the U-phase teeth portion 3 is at the inter-pole part between the N-pole and the S-pole, and the teeth portion 3 is not excited as viewed from the rotor 11, so that the magnetic flux is easily passed. This is also caused in the vicinity of the V-phase and W-phase teeth portions 3 where there is no magnetic flux (twice for each phase and therefore six times in total).

Figure 7:
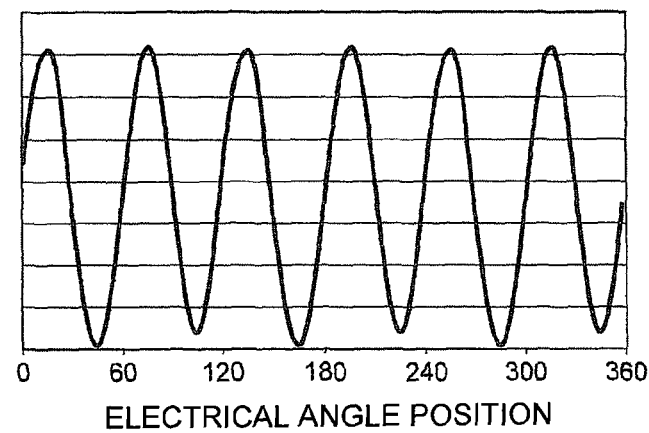
FIG. 7 is a graph showing the time course of magnet eddy current loss for an interior permanent magnet in the rotor according to the first embodiment of the present invention.

Here, FIG. 7 shows a result of subjecting magnet eddy current loss for the permanent magnet 13 in the weak magnetic flux control to magnetic field analysis. Note that the magnet eddy current loss for the permanent magnet 13 changes according to the rotation position, and therefore FIG. 7 shows a magnetic flux created by a U-phase in the stator and rotation positions under two conditions, i.e., when the eddy current at the permanent magnet 13 is large and small.

FIG. 7 shows the fluctuation of the magnet eddy current loss per cycle of electrical angle, and the magnet eddy current loss is maximum in the positional relation shown in FIG. 5 and corresponds to a six-peak waveform per rotation of electrical angle.

Figure 8:
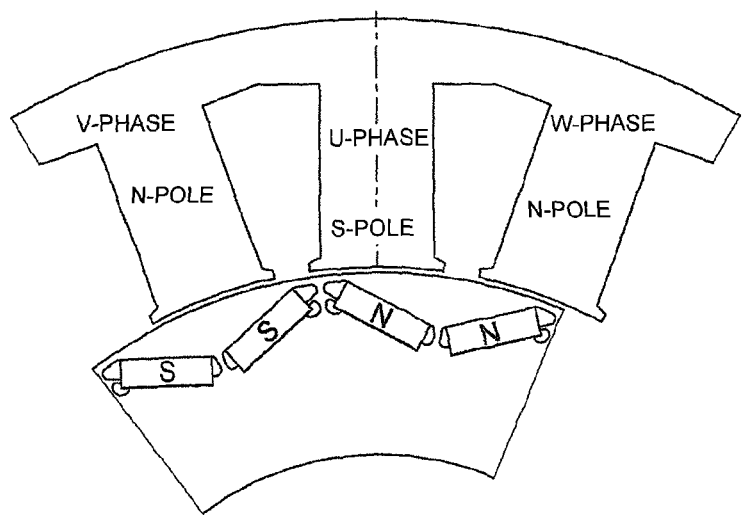
FIG. 8 is a view showing the positional relation of the stator and the rotor in the rotation direction according to the first embodiment of the present invention when the magnet eddy current loss for the permanent magnets is minimized.
Figure 9:
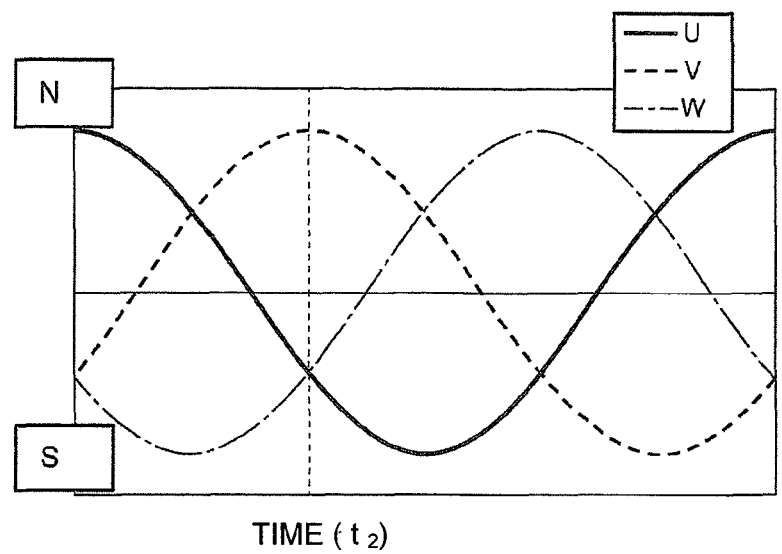
FIG. 9 is a graph showing the time course of magnetic poles in U-, V-, and W-phase windings in the stator according to the first embodiment of the present invention.

FIG. 8 shows the positional relation between the rotor and the stator in the position where the magnet eddy current loss is minimum. The U-phase, the V-phase, and the W-phase at the time correspond to magnet poles in time t2 indicated by the broken line in FIG. 9. As can be seen from FIG. 8, while the magnetic flux is easily passed since the U-phase is at the inter-pole part in the case in FIG. 5, the inter-pole part for the rotor 11 is in the gap (slot part) between the teeth portions 3 in the rotation position in FIG. 8, and therefore the magnetic flux resistance increases, which almost eliminates magnetic flux leakage as shown in FIG. 5. Therefore, there are two paths for magnetic flux leakage similarly to the case without a load, and the fluctuation of the magnetic flux is restrained in view of the permanent magnet 13, so that the magnet eddy current loss is reduced.

Figure 10:
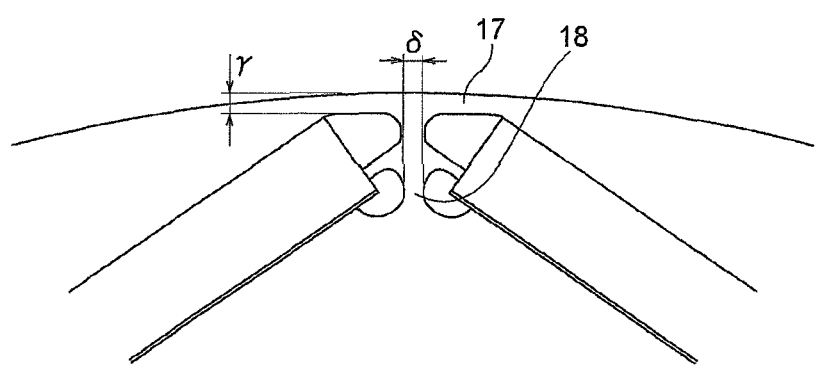
FIG. 10 is a detailed view of first and second bridge parts in the rotor according to the first embodiment of the present invention.
Figure 11:
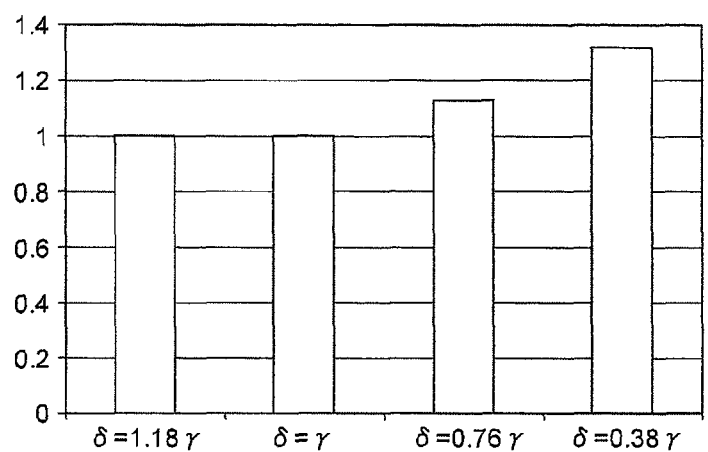
FIG. 11 is a graph showing the relation between the sizes of the first and second bridge parts and torque/magnet eddy current loss according to the first embodiment of the present invention.

In the foregoing, how the magnitude of the magnet eddy current loss changes has been described in conjunction with the cause for magnetic eddy current loss and the positional relation between the rotor 11 and the stator 1. Hereinafter, a method for reducing the magnet eddy current loss will be described. As shown in FIG. 10, the minimum width of the first bridge part 17 is γ, and the minimum width of the second bridge part 18 is δ. FIG. 11 shows a result of obtaining torque per magnet eddy current loss for the permanent magnet 13 by magnetic field analysis under four conditions on the relation between γ and δ, i.e., when (1) $\delta=1.18\beta$, (2) $\delta=\gamma$, (3) $\delta=0.76\gamma$, and (4) $\delta=0.38\gamma$. Here, under the condition (4), the thickness of the second bridge part 18 is substantially equal to the plate thickness of the core. Note that the amount of heat generated in the magnet is calculated on the basis of an analysis result obtained when the number of revolutions is 10000 r/min by way of illustration.

As can be understood from FIG. 11, as the width of the second bridge part 18 is narrower than γ, the torque per magnet eddy current loss increases. More specifically, it is indicated that high torque results for a smaller amount of heat generated in the magnet by narrowing the second bridge part 18. Meanwhile, when the width of the second bridge part 18 is greater than γ, the torque per magnet eddy current loss is substantially constant.

When $\delta=\gamma$, it is assumed that the magnet temperature is raised by 100° C. from the ambient temperature because of heat generation in the magnet. Note that the condition for 100° C. increase in the heating temperature of the magnet changes depending on the torque and the number of revolutions, the condition is based on an assumption. In this case, if $\delta=0.76\gamma$, torque per magnet eddy current loss is 1.13 times that for $\delta=\gamma$, and therefore the temperature rises by 88.5° C., and if $\delta=0.38\gamma$, the torque per magnet eddy current loss is 1.31 times, so that the temperature rises by 76.3° C.

Figure 12:
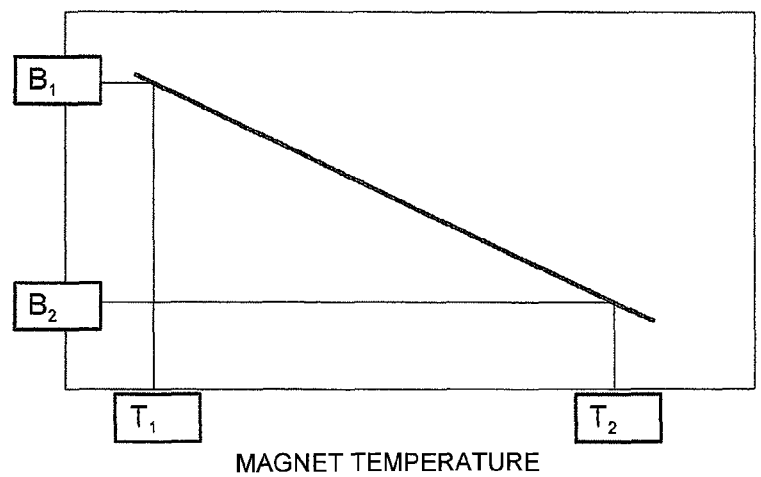
FIG. 12 is a graph showing the relation between the magnet temperature of a permanent magnet and the residual magnetic flux density according to the first embodiment of the present invention.

FIG. 12 shows the relation between the temperature of a neodymium magnet and the residual magnetic flux density. As shown in FIG. 12, the temperature coefficient for the residual magnetic flux density for the neodymium magnet is from −0.1%/° C. to −0.2%/C, and the residual magnetic flux density decreases as the temperature increases. Therefore, for the same magnet temperature, when $\delta=0.76\gamma$ and $\delta=0.38\gamma$, the temperature of the magnet is lower than that for $\delta=\gamma$, the torque can further be increased, and a greater difference than that shown in FIG. 11 results, so that the torque during high speed rotation can be increased.

Figure 13:
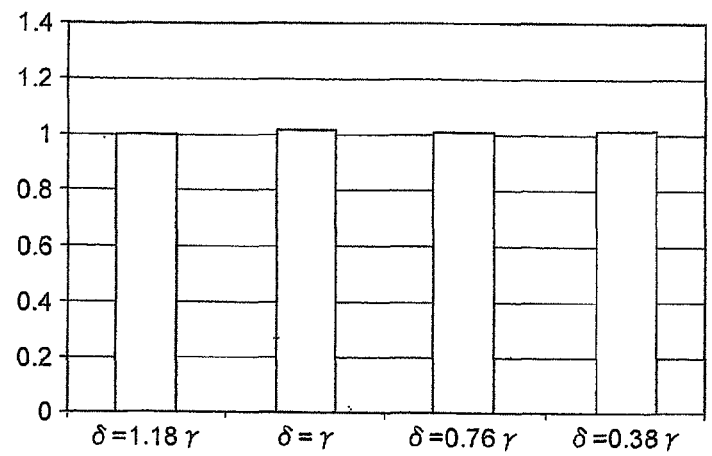
FIG. 13 is a graph showing the relation between the sizes of the first and second bridge parts and maximum stress in the rotor according to the first embodiment of the present invention.

FIG. 13 shows a result of analyzing the centrifugal force resistance of the rotor 11 under the conditions in FIG. 11, in other words, main stress upon the bridge part of the rotor 11. As shown, as the width of the second bridge part 18 is reduced, the burden of retaining the centrifugal force resistance of the rotor 11 by the bridge parts is covered by the first bridge part 17 corresponding to the inter-pole part between the magnets, and the maximum value of the main stress is increased by narrowing the second bridge part 18 but the increase is slightly less than 2%. Therefore, in order to achieve compatibility between the magnet eddy current loss and the centrifugal force resistance of the rotor, the minimum width γ of the second bridge part 18 is desirably at least as thick as the plate thickness and smaller than δ in consideration of restrictions associated with core blanking.

Note that according to the first embodiment, the ratio of the number of poles and the number of slots is 2:3, while the same advantageous effect is provided when the ratio of the number of poles and the number of slots is 4:3, 9±1:9, and 12±2:12.

It is assumed that the flux barrier 14 is a gap according to the first embodiment, while the same advantageous effect is provided when the flux barrier 14 is filled with resin such as epoxy.

Furthermore, as for the kind of the permanent magnet 13, the same advantageous effect is provided using a metallic samarium cobalt magnet having low resistivity as a magnet similarly to a neodymium magnet.

According to the first embodiment, reduction in the magnet eddy current loss and resistance against centrifugal force during high speed rotation can be balanced in a compatible manner.

Second Embodiment

Figure 14:
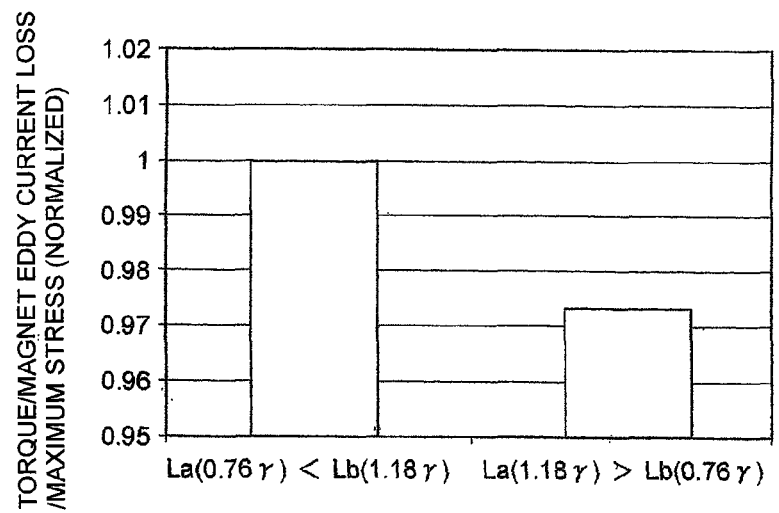
FIG. 14 is a graph showing the dependence of the relation between the torque of a rotor and magnet eddy current loss on the presence/absence of a magnetic flux fluctuation restraining hole according to a second embodiment of the present invention.

Now, a second embodiment of the present invention will be described. Note that the second embodiment is identical to the first embodiment described above in the content other than in the following description. FIG. 14 shows torque per magnet eddy current loss with or without a magnetic flux fluctuation restraining hole 15 provided at the inner periphery of the inter-pole part of the permanent magnets 13 according to the second embodiment of the present invention. Note that the magnetic flux fluctuation restraining hole 15 is a gap or covered with resin such as epoxy and made of a non-magnetic material in order to restrain magnetic flux short-circuiting of the magnet. The width δ of the second bridge part 18 is 1.18γ in the following description.

As can be understood from FIG. 14, the torque per magnet eddy current loss is 1.2 times as much by providing the magnetic flux fluctuation restraining hole 15. As for the centrifugal force resistance of the rotor 11 described in conjunction with the first embodiment, the width of the second bridge part 18 is the same and therefore the stress does not increase by providing the magnetic flux fluctuation restraining hole 15.

Here, reduction in the eddy current loss of the permanent magnet 13 will be described with reference to FIG. 4. As described in conjunction with the first embodiment, there are two magnetic flux leakage paths, i.e., the first magnetic flux leakage path 21 and the second magnetic flux leakage path 22 for the leaked magnetic flux from the permanent magnet 13, while the magnetic resistance in the first and second magnetic flux leakage paths increases by providing the magnetic flux fluctuation restraining hole 15 at a corner of the magnet, and therefore the fluctuation of the magnetic flux is restrained in view of the permanent magnet 13. More specifically, the magnet eddy current loss generated by the fluctuation of the magnetic flux of the permanent magnet 13 can be reduced.

The magnetic flux fluctuation restraining hole 15 is provided at the inner periphery of the inter-pole part of the permanent magnet 13 in the circumferential direction, and the magnetic flux fluctuation restraining hole 15 must be provided at a corner of the magnet since the first and second magnetic flux leakage paths passing an end of the permanent magnet 13 in the longer side direction as shown in FIG. 4. The magnetic flux fluctuation restraining hole 15 is shown as protruding beyond the corner of the permanent magnet 13 to the inter-pole part. In this way, the fluctuation of the magnetic flux through the corner of the permanent magnet 13 can be more restrained. Note that according to the second embodiment, the magnetic flux fluctuation restraining hole 15 formed as a gap may also be used as a hole for cooling the permanent magnet.

Figure 15:
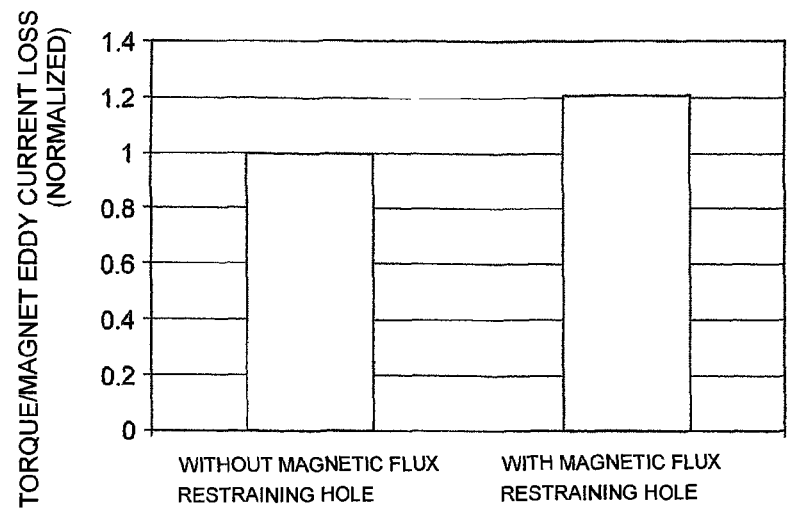
FIG. 15 is an enlarged view of magnetic flux fluctuation restraining holes in the rotor according to the second embodiment of the present invention.

According to the second embodiment, the magnetic flux fluctuation restraining hole 15 has a substantially circular shape but the hole may be extended extremely to the vicinity of the q axis as shown in FIG. 15. This might be disadvantageous in terms of the centrifugal force resistance, but as for the centrifugal force resistance, stress hardly increases if the magnetic flux fluctuation restraining hole 15 is provided up to the vicinity of the q axis as shown in FIG. 15. This is because stress generated at the first bridge part 17 is applied mainly in the bending direction and therefore bending strength can be absorbed with a structural member at the q axis part. Therefore, the structural member is necessary on the q axis in the configuration.

Third Embodiment

Now, a third embodiment of the present invention will be described. Note that the third embodiment is identical to the first or second embodiment in the content other than in the following.

Figure 16:
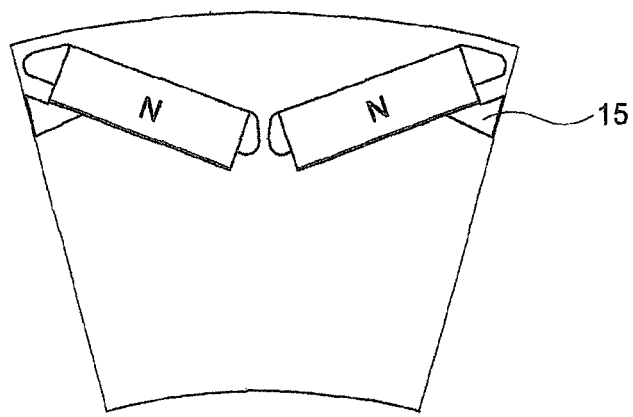
FIG. 16 is an enlarged view of flux barriers and magnetic flux fluctuation restraining holes in the rotor according to the third embodiment of the present invention.

FIG. 16 is a detailed view showing the positional relation among permanent magnets 13, a rotor core 12, flux barriers 14, and magnetic flux fluctuation restraining holes 15 according to the third embodiment of the present invention. In the figure, the permanent magnet 13 has a substantially oblong shape, the flux barrier 14 is provided on the rotor surface side at each of both ends of the permanent magnet 13 (at the end of a longer side of the permanent magnet 13 on the outer peripheral surface side of the rotor), and the magnetic flux fluctuation restraining hole 15 is provided on the radially inner side of each of both ends of the permanent magnet 13 (at the end of the longer side of the permanent magnet 13 on the rotation center side of the rotor 11). A magnet positioning portion 31 (in a linear shape) is provided along the shape of the permanent magnet 13 between the flux barrier 14 and the magnetic flux fluctuation restraining hole 15. In this case, the magnet eddy current loss and the centrifugal force resistance of the permanent magnet 13 are the same as those according to the first and second embodiments, while the permanent magnet 13 can easily be positioned in the circumferential and radial directions of the permanent magnet 13 by allowing the shorter side of the permanent magnet 13 to contact the linear portion, so that variations in the magnetic flux amount depending on the insertion position of the permanent magnet 13 can be restrained.

Note that the magnet positioning portion 31 is desirably provided in a position on the radially inner side than the center of the shorter side of the magnet. This is because the shape of the flux barrier 14 at the first bridge part 17 is a circular arc shape in order to reduce stress applied on the first bridge part 17, and if the positioning portion is provided on the outer peripheral side, the radius of the circular arc would be reduced, and the stress on the first bridge part 17 would increase, which must be avoided.

Fourth Embodiment

Now, a fourth embodiment of the present invention will be described. Note that the fourth embodiment is identical to any of the first to third embodiments in the content other than in the following.

Figure 17:
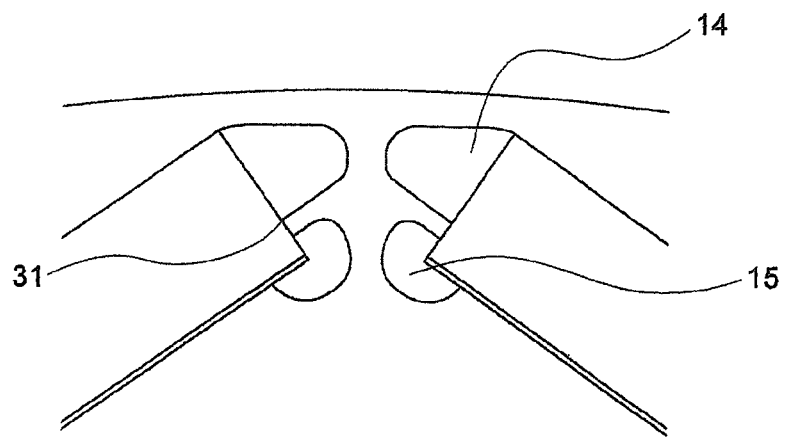
FIG. 17 is a view showing a fourth magnetic flux leakage path in a rotor according to a fourth embodiment of the present invention.

FIG. 17 shows the positional relation among permanent magnets 13, a rotor core 12, flux barriers 14, magnetic flux fluctuation restraining holes 15, a first bridge part 17, a second bridge part 18, and a third bridge part 19 according to the fourth embodiment of the present invention. In the figure, single-pole permanent magnets are in a V-shaped arrangement similarly to the first and second embodiments. A fourth magnetic flux leakage path 41 at the third bridge part 19 will also be described.

Here, at the third bridge part 19, the permanent magnets 13 are embedded deeply inside the rotor, and as described in conjunction with the first embodiment, there is almost no magnetic flux fluctuation when the teeth portions 3 and the slot portions between the teeth portions 3 pass the radial side of the third bridge part 19. The third bridge part 19 is in the center of the pole for the V-shape arrangement, so that the magnetic flux of the magnet generates a magnetic flux of the same pole on each side of the third bridge part 19 in the circumferential direction. Therefore, there is no fluctuation of a magnetic flux attributable to the magnets at the third bridge part 19. Therefore, as described in conjunction with the first embodiment, only the inter-pole part (the second magnetic flux leakage path 22) must be shut off as a magnetic flux leakage path, and it is more effective against increase in the magnet eddy current loss to shut off the second magnetic flux leakage path 22 rather than the fourth magnetic flux leakage path 41. More specifically, the magnet eddy current loss can effectively be restrained by increasing the magnetic resistance of the inter-pole part (in the vicinity of the q-axis) rather than the magnetic resistance of the magnetic pole center part (far from the q-axis).

Figure 18:
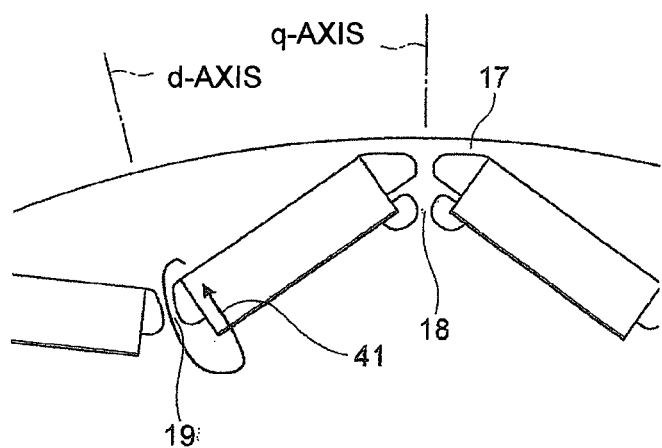
FIG. 18 is a sectional view of a stator and a rotor when permanent magnets according to the fourth embodiment of the present invention are in a U-shape arrangement.
Figure 19:
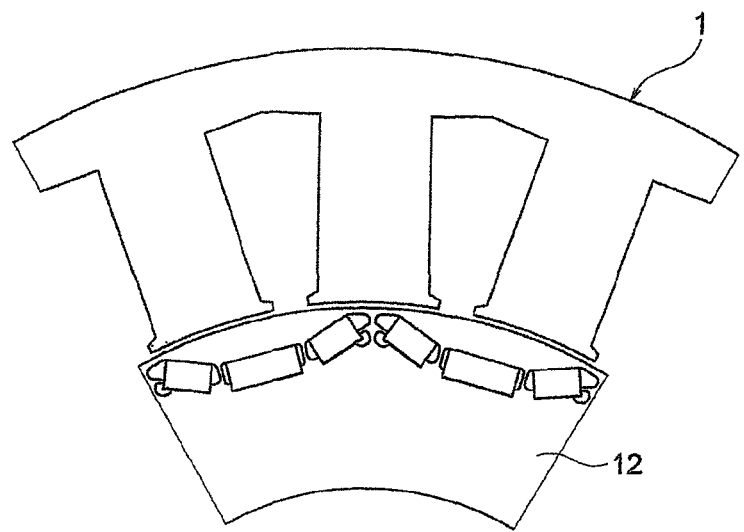
FIG. 19 is a sectional view of a stator and a rotor when the permanent magnets according to the fourth embodiment of the present invention are each divided into two.

Note that according to the fourth embodiment, two magnets are arranged in the V-shape per pole, but the same advantageous effect is provided by arranging three magnets per pole in a U-shape as shown in FIG. 18 or magnets each divided in two parts may be arranged in a flat plate shape as shown in FIG. 19.

Fifth Embodiment

A fifth embodiment of the present invention will be described. Note that the fifth embodiment is identical to any of the first to fourth embodiments in the content other than in the following.

Figure 20:
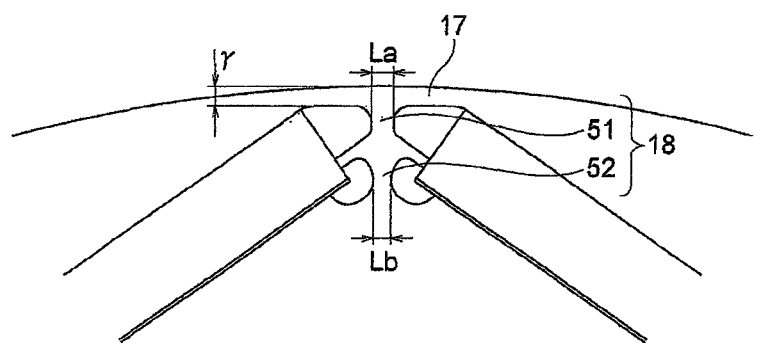
FIG. 20 is a detailed view of first and second bridge parts in a rotor according to a fifth embodiment of the present invention.

FIG. 20 shows the positional relation among permanent magnets 13, a rotor core 12, flux barriers 14, magnetic flux fluctuation restraining holes 15, a first bridge part 17, a second-a bridge part 51, and a second-b bridge part 52 according to the fifth embodiment of the present invention.

The second-a bridge part 51 is a bridge part on the side closer to the rotor surface, and the second-b bridge part 52 is a bridge part further from the rotor surface. Here, La<Lb is desirably established where the minimum width of the second-a bridge part 51 is La, and the minimum width of the second-b bridge part 52 is Lb.

Figure 21:
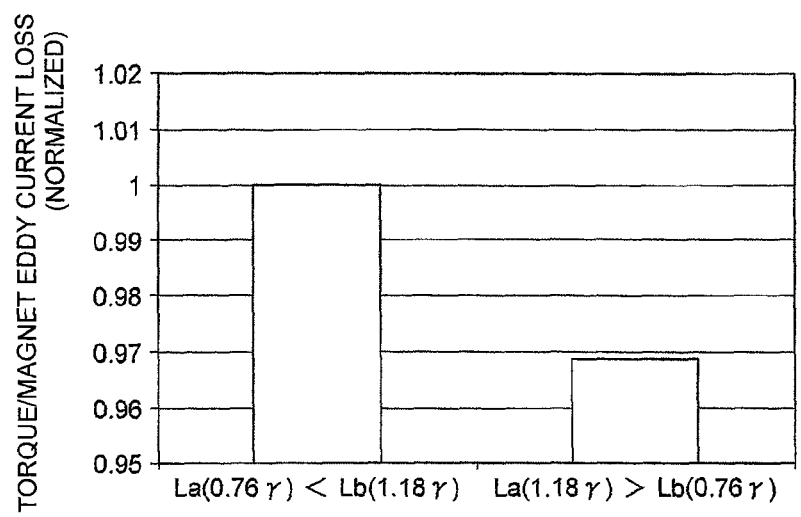
FIG. 21 is a graph showing torque per magnet eddy current loss in relation to the fifth embodiment.

Now, an advantageous effect brought about when La<Lb is established will be described. For the purpose of illustrating the effect, the wider width between La and Lb is 1.18γ, and the narrower width is 0.76γ in the following description. FIG. 21 shows torque per magnet eddy current loss. The values in FIG. 21 are all normalized with respect to values for La<Lb.

As shown, the torque per magnet eddy current loss is 3.1% greater when La(0.76γ)<Lb(1.18γ) than when La(1.18γ)>Lb(0.76γ).

Figure 22:
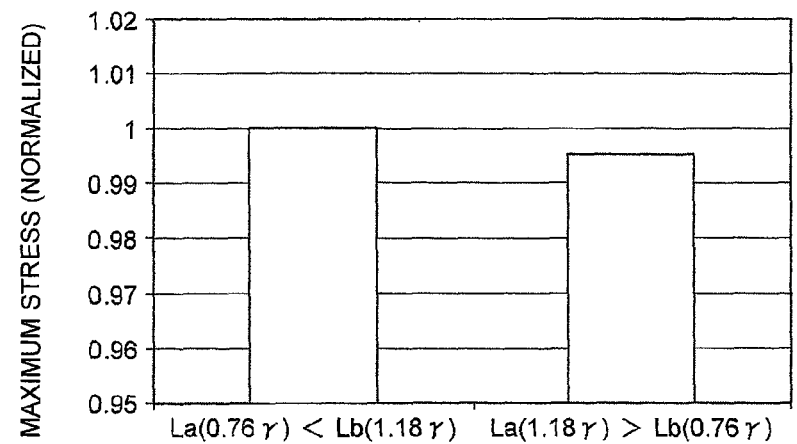
FIG. 22 is a graph showing the centrifugal force strength of rotors in comparison in relation to the fifth embodiment.

FIG. 22 shows a result of comparison about the centrifugal force strength of the rotor between when La(0.76γ)<Lb (1.18γ) and La(1.18γ)>Lb(0.76γ). As shown, the maximum value of the centrifugal force is 0.5% lower when La(1.18γ) >Lb (0.76γ).

Figure 23:
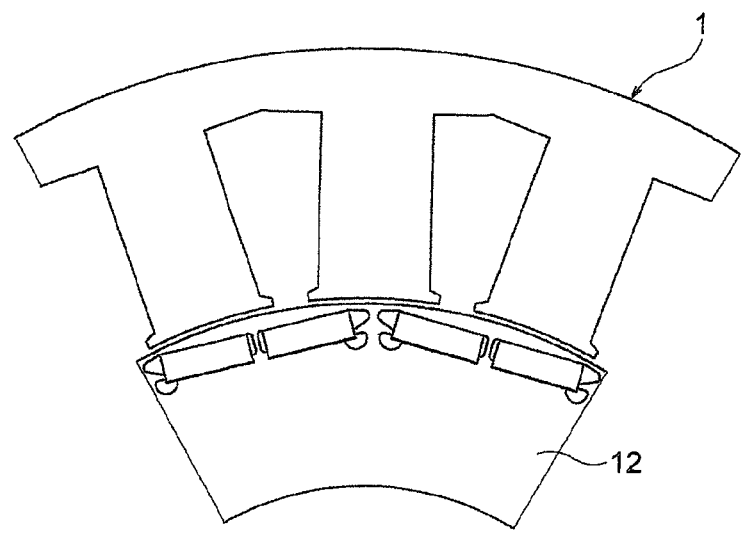
FIG. 23 is a graph showing torque per magnet eddy current loss normalized with respect to centrifugal force resistance in relation to the fifth embodiment.

Here, FIG. 23 shows torque per eddy current loss of the magnet normalized with respect to centrifugal force resistance. As shown, the value produced by dividing the torque per magnet eddy current loss by the centrifugal force resistance is 2.6% greater for La<Lb, and therefore it is desirable to establish La<Lb.

Sixth Embodiment

Now, a sixth embodiment of the present invention will be described. Note that the sixth embodiment is identical to any of the first to fifth embodiments in the content other than in the following.

Figure 24:
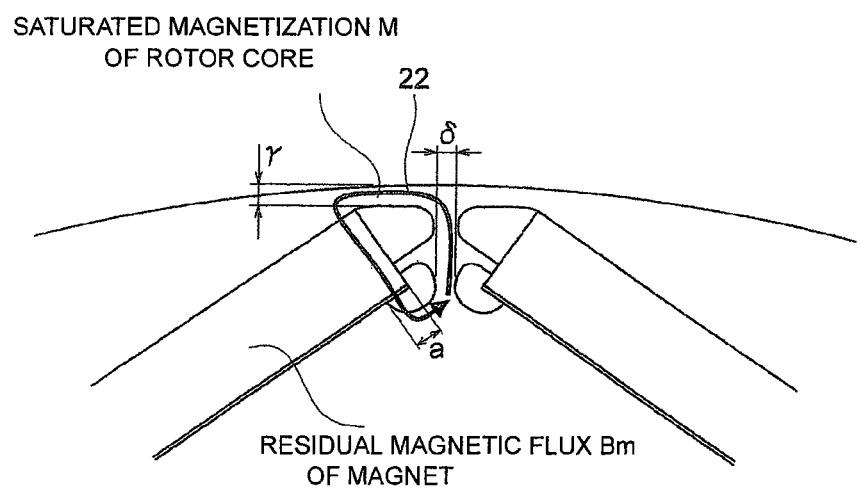
FIG. 24 is an enlarged view of a first magnetic flux leakage path in the q-axis part of a rotor according to a sixth embodiment of the present invention.

FIG. 24 shows the relation among permanent magnets 13, a rotor core 12, and magnetic flux fluctuation restraining holes 15 according to the sixth embodiment of the present invention. In the figure, a second magnetic flux leakage path 22 is also shown, the saturated magnetization of the rotor core is defined as M, and the residual magnetic flux density of the permanent magnet is defined as Bm. Here, the magnetic flux fluctuation restraining hole 15 (gap) is described as a magnetic resistance member. The width of the magnetic flux fluctuation restraining hole 15 in the longer side component of the permanent magnet 13 is defined as a.

Here, in the magnetic flux leakage of the permanent magnet 13 in the second magnetic flux leakage path 22, the path runs in the range of the width α in the lengthwise direction of the permanent magnet 13 until the first bridge part 17 is magnetically saturated. The saturated magnetization M of the rotor core is about 2 T, the residual magnetic flux density Bm of the permanent magnet 13 is from 1.2 T to 1.4 T at normal temperature, and the width of the permanent magnet 13 used for the magnet leaked magnetic flux is $\alpha = M \times \gamma / Bm$. The residual magnetic flux density Bm of the permanent magnet 13 tends to decrease as the temperature of the magnet increases as shown in FIG. 12. Therefore, when the temperature range in a use environment is from the lower limit value T1 to the upper limit value T2, the corresponding residual magnetic flux densities of the permanent magnet 13 can be indicated as B1 and B2 as shown in FIG. 12. Therefore, the width α of the magnetic flux fluctuation restraining hole 15 in the lengthwise direction of the permanent magnet 13 is desirably expressed by $M \times \gamma / B1 < a < M \times \gamma / B2$.

According to the sixth embodiment, the decrease in the torque can be prevented and the magnet eddy current loss can be reduced by increasing the magnetic resistance of a part close to a corner of the magnet where the magnetic flux leakage of the magnet greatly fluctuates.

Figure 25:
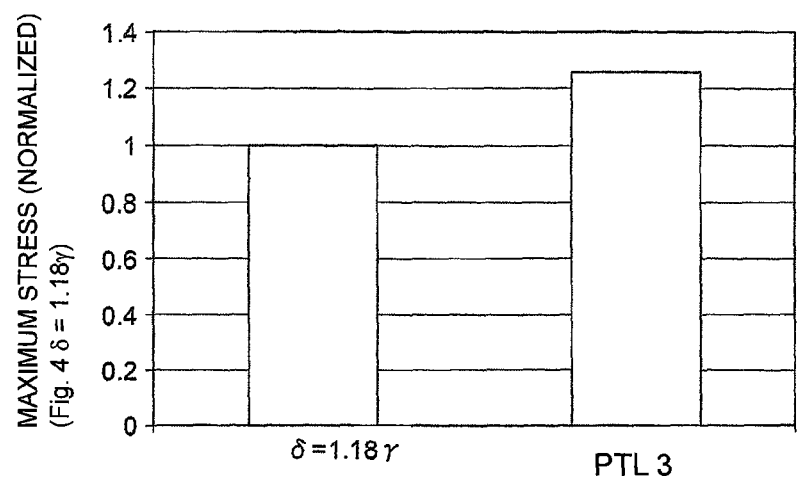
FIG. 25 is a comparative view showing maximum stress according to the first to sixth embodiments and PTL 3.

As in the foregoing, while the magnetic resistance in the magnetic flux leakage path between the q-axes is increased and the centrifugal force strength of the rotor 11 is increased according to the present invention, the magnetic flux leakage may be reduced by providing the q axis with a slit as disclosed by PTL 3, but in terms of the centrifugal force strength of the rotor 11, the slit provided on the q-axis as shown in FIG. 25 puts an excessive burden of the stress support against centrifugal force on the third bridge part 19, and the maximum stress becomes 1.25 times as large. Therefore, as described above, according to the present invention, the magnetic flux fluctuation restraining hole 15 (magnetic resistance member) is desirably provided at each corner of a magnet in an all-electric car or a hybrid vehicle driven with high speed rotation.

While preferred embodiments of the present invention have specifically been described, variations and modifications will be apparent to those skilled in the art in view of the basic technical ideas and teachings of the present invention.

While in the description of the first to sixth embodiments, the magnetic flux fluctuation restraining hole 15 (gap with a relative permeability of 1) is used in order to shut off paths for magnetic flux leakage from the permanent magnet 13, the magnetic flux fluctuation restraining hole 15 may be made of a non-magnetic material (may be impregnated with resin such as epoxy), and still the same advantageous effect is provided. The magnetic flux fluctuation restraining hole 15 may be made of a material with lower permeability than that of the rotor core 12 in view of increase in short-circuiting magnetic resistance.

REFERENCE SIGNS LIST

1 Stator
2 Stator core
3 Teeth portion
4 Core back portion
11 Rotor
12 Rotor core
13 Permanent magnet
14 Flux barrier
15 Magnetic flux fluctuation restraining hole (magnetic resistance member)
16 Rotation shaft
17 First bridge part
18 Second bridge part
19 Third bridge part
20 Gap
21 First magnetic flux leakage path
22 Second magnetic flux leakage path
23 Third magnetic flux leakage path
24 Rotation direction
31 Magnet positioning portion
41 Fourth magnetic flux leakage path

The invention claimed is:

1. A rotary electric machine comprising a stator, and a rotor, the stator including an annular core back portion and a teeth portion that extends from the core back portion toward the rotor and has a stator winding wound therearound, the rotor including a rotor core made of a magnetic material, and permanent magnets supported on the rotor core, $\alpha > \beta$ being established when the teeth portion has a width $\alpha$ in a circumferential direction thereof, a rotation center of the rotor and one of corners, which is on a rotor surface side, on both ends of each of the permanent magnets are connected by a straight line, a center between N-poles of the permanent magnets is on a d-axis, and a center between an N-pole and an S-pole of the permanent magnets is on a q-axis, and an angle formed by two of the straight lines on a q-axis side is $\beta$, a flux barrier being provided at each of circumferential both ends of each of the permanent magnets in the rotor core, the rotor core having a first bridge part between the flux barrier and the rotor surface, $\gamma > \delta$ being established when the first bridge part has a minimum width $\gamma$, and a bridge part between the flux barrier has a minimum width $\delta$ on the q-axis, each of the permanent magnets having an oblong shape, the flux barrier being provided at each of both ends of the permanent magnet on the rotor surface side, and a magnetic flux fluctuation restraining hole being provided at each of both ends of the permanent magnet on a radially inner side, a linear portion capable of retaining a shorter side of the permanent magnet being provided between the flux barrier and the magnetic flux fluctuation restraining hole, La<Lb being established when a part of a bridge part between the flux barriers on the q-axis that is closer to the rotor surface is a second-a bridge part, a part thereof that is further from the rotor surface is a second-b bridge part, the second-a bridge cart has a width La, and the second-b bridge part has a width Lb, a phase for weak magnetic flux control, in which the stator winding creates a magnetic flux in an opposite direction to a direction of a magnetic flux of the permanent magnet, being advanced so that the angle $\beta$ formed by the two straight lines on the q-axis side is entirely included in a range of the width $\alpha$ of the teeth portion in the circumferential direction when a magnetic flux created by excitation of the stator winding is eliminated at the teeth portion and so that the q-axis is ahead of a center of the teeth portion in a rotation direction of the rotor when a magnetic flux created by excitation of the stator winding is eliminated at the teeth portion.

2. The rotary electric machine of claim 1, wherein each of the permanent magnets is divided into a plurality of pieces per pole, and magnetic resistance in a magnetic flux leakage path passing a bridge part between the flux barriers on the q-axis is greater than magnetic resistance in a magnetic flux leakage path passing a bridge part between the flux barriers on an end side of the permanent magnet that is far from the q-axis.

3. The rotary electric machine of claim 2, wherein the magnetic flux fluctuation restraining hole with a smaller magnetic permeability than that of the rotor core is provided at an inter-pole radially inner corner of each of the permanent magnets in an inter-pole part, and M×γ/B<a<M×γ/B2 (where B1>B2) is established when the permanent magnet in contact with the magnetic flux fluctuation restraining hole has a width a in a longer side direction, the rotor core has a saturated magnetization M, the permanent magnet has an operation temperature from a minimum value T1 to a maximum value T2, the permanent magnet has a residual magnetic flux density that decreases with temperature increase, the residual magnetic flux density for the minimum value of the operation temperature of the permanent magnet is B1, and the residual magnetic flux density for the maximum value of the operation temperature of the permanent magnet is B2.

4. The rotary electric machine of claim 3, wherein the ratio of the number of poles of the rotor and the number of the teeth portion is 2:3.

5. The rotary electric machine of claim 4, wherein each of the permanent magnets is divided into two per pole, and two of the permanent magnets are arranged in a V-shape per pole toward an outer periphery of the rotor.

6. The rotary electric machine of claim 3, wherein each of the permanent magnets is divided into two per pole, and two of the permanent magnets are arranged in a V-shape per pole toward an outer periphery of the rotor.

7. The rotary electric machine of claim 2, wherein the ratio of the number of poles of the rotor and the number of the teeth portion is 2:3.

8. The rotary electric machine of claim 7, wherein each of the permanent magnets is divided into two per pole, and two of the permanent magnets are arranged in a V-shape per pole toward an outer periphery of the rotor.

9. The rotary electric machine of claim 2, wherein each of the permanent magnets is divided into two per pole, and two of the permanent magnets are arranged in a V-shape per pole toward an outer periphery of the rotor.

10. The rotary electric machine of claim 2, wherein the magnetic flux fluctuation restraining hole with a smaller magnetic permeability than that of the rotor core is provided at an inter-pole radially inner corner of each of the permanent magnets in an inter-pole part, and M×γ/B1<a<M×γ/B2 (where B1>B2) is established when the permanent magnet in contact with the magnetic flux fluctuation restraining hole has a width a in a longer side direction, the rotor core has a saturated magnetization M, the permanent magnet has an operation temperature from a minimum value T1 to a maximum value T2, the permanent magnet has a residual magnetic flux density that decreases with temperature increase, the residual magnetic flux density for the minimum value of the operation temperature of the permanent magnet is B1, and the residual magnetic flux density for the maximum value of the operation temperature of the permanent magnet is B2.

11. The rotary electric machine of claim 10, wherein the ratio of the number of poles of the rotor and the number of the teeth portion is 2:3.

12. The rotary electric machine of claim 11, wherein each of the permanent magnets is divided into two per pole, and two of the permanent magnets are arranged in a V-shape per pole toward an outer periphery of the rotor.

13. The rotary electric machine of claim 10, wherein each of the permanent magnets is divided into two per pole, and two of the permanent magnets are arranged in a V-shape per pole toward an outer periphery of the rotor.

14. The rotary electric machine of claim 1, wherein the ratio of the number of poles of the rotor and the number of the teeth portion is 2:3.

15. The rotary electric machine of claim 14, wherein each of the permanent magnets is divided into two per pole, and two of the permanent magnets are arranged in a V-shape per pole toward an outer periphery of the rotor.

16. The rotary electric machine of claim 1, wherein each of the permanent magnets is divided into two per pole, and two of the permanent magnets are arranged in a V-shape per pole toward an outer periphery of the rotor.

* * * * *

UNITED STATES PATENT AND TRADEMARK OFFICE
CERTIFICATE OF CORRECTION

PATENT NO. : 10,447,099 B2
APPLICATION NO. : 15/752941
DATED : October 15, 2019
INVENTOR(S) : Moriyuki Hazeyama et al.

It is certified that error appears in the above-identified patent and that said Letters Patent is hereby corrected as shown below:

In the Claims

Column 12, Line 46 in Claim 3, "$M \times \gamma/B < a < M \times \gamma/B2$" should read --$M \times \gamma/B1 < a < M \times \gamma/B2$--.

Signed and Sealed this
Seventh Day of July, 2020

Andrei Iancu
*Director of the United States Patent and Trademark Office*